United States Patent
Sakai et al.

(10) Patent No.: US 6,430,032 B2
(45) Date of Patent: Aug. 6, 2002

(54) SOLID ELECTROLYTIC CAPACITOR AND METHOD FOR PRODUCING THE SAME

(75) Inventors: Atsushi Sakai; Ryuji Monden; Yuji Furuta; Katsuhiko Yamazaki; Tatsuo Obata, all of Nagano (JP)

(73) Assignee: Showa Denko K. K., Tokyo (JP)

( * ) Notice: Subject to any disclaimer, the term of this patent is extended or adjusted under 35 U.S.C. 154(b) by 0 days.

(21) Appl. No.: 09/899,209

(22) Filed: Jul. 6, 2001

Related U.S. Application Data

(60) Provisional application No. 60/257,303, filed on Dec. 26, 2000, and provisional application No. 60/216,518, filed on Jul. 6, 2000.

(51) Int. Cl.$^7$ .................................................. H01G 9/00
(52) U.S. Cl. ...................... 361/523; 361/528; 361/508; 361/524; 361/518; 29/25.03
(58) Field of Search ................................ 361/523, 540, 361/517, 518, 525, 527, 433, 323, 508, 524, 528, 535; 29/25.03

(56) References Cited

U.S. PATENT DOCUMENTS

| | | | |
|---|---|---|---|
| 4,803,596 A | | 2/1989 | Hellwig et al. |
| 4,864,472 A | * | 9/1989 | Yoshimura et al. ......... 361/525 |
| 4,910,645 A | | 3/1990 | Jonas et al. |
| 4,934,033 A | * | 6/1990 | Harakawa et al. ......... 29/25.03 |
| 4,943,892 A | * | 7/1990 | Tsuchiya et al. ............ 361/525 |
| 4,959,753 A | | 9/1990 | Kudoh et al. |
| 5,140,502 A | * | 8/1992 | Kudoh et al. ............... 361/540 |
| 5,457,862 A | | 10/1995 | Sakata et al. |
| 5,621,608 A | * | 4/1997 | Arai et al. ................... 361/525 |
| 5,790,368 A | * | 8/1998 | Naito et al. ................. 361/523 |
| 6,042,740 A | * | 3/2000 | Uehara et al. ............. 252/62.2 |
| 6,110,234 A | * | 8/2000 | Sakata et al. .............. 29/25.03 |
| 6,128,180 A | | 10/2000 | Araki et al. |
| 6,210,450 B1 | * | 4/2001 | Fukaumi et al. ........... 29/25.03 |
| 6,229,689 B1 | * | 5/2001 | Kobayashi et al. ......... 361/525 |

FOREIGN PATENT DOCUMENTS

| | | |
|---|---|---|
| JP | 61-239617 | 10/1986 |
| JP | 61-240625 | 10/1986 |
| JP | 62-118511 | 5/1987 |
| JP | 2-15611 | 1/1990 |
| JP | 3-6217 | 1/1991 |
| JP | 4-307917 | 10/1992 |
| JP | 8-330191 | 12/1996 |
| JP | 9-320901 | 12/1997 |
| JP | 10-32145 | 2/1998 |
| JP | 11-80596 | 3/1999 |
| JP | 11-238648 | 8/1999 |
| JP | 11-251191 | 9/1999 |
| JP | 11-283878 | 10/1999 |

OTHER PUBLICATIONS

Elsenbaumer, R. L., et al., *Synthetic Metals*, "Processible and Environmentally Stable Conducting Polymers", vol. 15 (1986), pp. 169–174.

* cited by examiner

*Primary Examiner*—Dean A. Reichard
*Assistant Examiner*—Nguyen Ha
(74) *Attorney, Agent, or Firm*—Sughrue Mion, PLLC

(57) ABSTRACT

To provide a solid electrolytic capacitor where solid electrolyte is formed at the cut end part and at the masking part to a larger thickness than in other parts, where the adhesion of the solid electrolyte formed on the valve acting metal oxide film is improved, and whereby the capacitor is highly stabilized in various basic properties such as capacitance, dielectric loss (tan δ), leakage current and short circuit defective ratio and also in the reflow soldering heat resistance and moisture resistance load characteristics.

These solid electrolytic capacitor can be obtained by forming electrically conducting polymer on a dielectric film by specifying time for dipping of the surface of a valve actiong metal porous body with a solution containing a monomer and with a solution containing an oxidizing agent, time for vaporization of the solvent of the solution containing a monomer, and polymerization conditions after dipping of the solution containing an oxidizing agent.

13 Claims, 2 Drawing Sheets

SOLID ELECTROLYTIC CAPACITOR AND METHOD FOR PRODUCING THE SAME

CROSS-REFERENCE TO RELATED APPLICATIONS

This application is based on the provisions of 35 U.S.C. Article 111(a) with claiming the benefit of filing dates of U.S. provisional applications Ser. No. 60/216,518 filed on Jul. 6, 2000 and 60/257,303 filed on Dec. 26, 2000 under the provisions of 35 U.S.C. 111(b), pursuant to 35 U.S.C. Article 119(e) (1).

TECHNICAL FIELD

The present invention relates to a solid electrolytic capacitor comprising a porous valve-acting metal substrate having formed thereon an electrically conducting polymer as a solid electrolyte layer and also relates to a method for producing the solid electrolytic capacitor.

More specifically, it relates to a high-performance solid electrolytic capacitor obtained by forming the solid electrolyte layer such that the thickness at the cut surface of the substrate and at the masking boundary part is larger than the thickness in other parts, and also relates to a method for producing the solid electrolytic capacitor, especially using a monomer solution and an oxidizing agent solution.

BACKGROUND ART

In the production of a solid electrolytic capacitor, as shown in FIG. 1, an oxide dielectric film layer 2 is generally formed on an anode substrate 1 comprising a metal foil subjected to an etching treatment to have a large specific surface area, a solid semiconductor layer (hereinafter referred to as a "solid electrolyte") 4 is formed as a counter electrode in the outer side of the dielectric layer and further thereon, an electrically conducting layer 5 such as electrically conducting paste is preferably formed, thereby fabricating a capacitor basic device. This device by itself or a stacked body resultant from stacking these devices is connected with lead wires 6,7 and thereafter, the whole is completely molded with epoxy resin 8 or the like and then put into use as a capacitor part in electric articles over a wide range.

In recent years, with the progress of digitization of electrical instruments or high-speed processing of personal computers, a compact and large-capacitance capacitor or a capacitor showing low impedance in the high frequency region is being demanded.

As the compact and large-capacitance capacitor, electrolytic capacitors such as aluminum electrolytic capacitor and tantalum electrolytic capacitor are known.

The aluminum electrolytic capacitor is advantageous in that a large-capacitance capacitor can be obtained at a low cost but suffers from such problems that when an ion conducting liquid electrolyte is used as the electrolyte, the impedance in the high frequency region is high, the capacitance decreases accompanying the evaporation of the electrolytic solution with the passing of time and the temperature characteristics are inferior.

The tantalum electrolytic capacitor where a manganese oxide is generally used as the electrolyte, has such problems that the manganese oxide predominantly produced by the thermal decomposition of manganese nitrate cannot be evaded from the possibility of the dielectric film having damages at the thermal decomposition and due to the relatively high specific resistance, the impedance in the high frequency region is high.

In order to solve these problems, it has been proposed to use an electrically conducting polymer having electric conductivity as the solid electrolyte. For example, use of an intrinsic conducting polymer having an electric conductivity of $10^{-3}$ to $10^3$ S/cm (see, JP-A-1-169914 (the term "JP-A" as used herein means an "unexamined published Japanese patent application") (corresponding to U.S. Pat. No. 4,803,596)) and use of a polymer such as polyaniline (see, JP-A-61-239617), polypyrrole (see, JP-A-61-240625), a polythiophene derivative (see, JP-A-2-15611 (corresponding to U.S. Pat. No. 4,910,645)) or polyisothianaphthene (see, JP-A-62-118511) are known. These electrically conducting polymers comprising a π-conjugated structure are mostly used in the form of a composition containing a dopant.

In recent years, not only the addition of a dopant but also a combination use with, for example, manganese dioxide (see, JP-B-6-101418 (the term "JP-B" as used herein means an "examined Japanese patent publication") (corresponding to U.S. Pat. No. 4,959,753)) or filler (see, JP-A-9-320901) is employed.

With respect to the shape of the solid electrolyte, it has been proposed to weld a metal onto an aluminum foil and thereby form a starting point for growing an electrically conducting polymer by the electrolytic oxidative polymerization throughout the surface of the aluminum foil (see, JP-A-4-307917).

Also, a method of performing the alternate impregnation with a monomer solution and with an oxidizing agent solution each from 1 to 20 times and the dipping in an oxidizing solution for 5 minutes to 5 hours, thereby improving the polymerization efficiency, has been proposed (see, JP-A-11-238648).

PROBLEMS TO BE SOLVED BY THE INVENTION

These conventional methods for producing a solid electrolytic capacitor using an electrically conducting polymer as the solid electrolyte have the following problems.

(1) When monomer is used in forming a solid electrolyte layer, a mixed solution of monomer and an oxidizing agent is used and the monomer in the mixed solution is polymerized by itself due to the oxidizing action of the oxidizing agent in the mixed solution and converts into polymer. This polymer must be discarded. Therefore, monomer in the mixed solution cannot be used effectively and the use efficiency of the starting material is very bad.

(2) The mixed solution of monomer and an oxidizing agent changes in the property and therefore, the process of forming the solid electrolyte layer is unstable, for example, the oxidizing action of the oxidizing agent decreases to shorten the life of the mixed solution.

(3) In addition, even when the oxidizing agent solution and the monomer solution are separately prepared (two solutions) and the metal foil substrate is alternately dipped in these solutions, the monomer disadvantageously dissolves out into the oxidizing agent solution at the time of dipping the substrate impregnated with the monomer solution in the oxidizing agent solution for a predetermined time period, and the monomer polymerizes in the oxidizing agent solution. As a result, the life of the oxidizing agent solution is extremely shortened. Also, in the case of dipping the metal foil substrate in the oxidizing agent solution and then in the monomer solution for a predetermined time period, the life of the monomer solution is similarly shortened.

(4) In the preparation of the mixed solution of monomer and an oxidizing agent, the concentrations of and the mixing ratio between monomer and the oxidizing agent have a certain limit, therefore, the monomer concentration cannot be freely selected and for forming the solid electrolyte layer to have a desired thickness, for example, the number of times of performing the polymerization must be disadvantageously increased.

(5) According to the method of repeating the alternate dipping in the oxidizing agent solution and in the monomer solution to perform the polymerization, a washing step is generally provided after each polymerization. This washing operation every each polymerization and the time spent therefor not only lower the production efficiency of a solid electrolytic capacitor device but also decrease the strength of the polymer solid electrolyte layer part, because overlapping of the polymer solid electrolyte layers is reduced. Thus, improvement is necessary also in view of the capability of the solid electrolytic capacitor.

(6) Since the dielectric layer is formed only by an electrochemical forming treatment in the later step, the cut surface (cut end part) formed in cutting the porous valve-acting metal into a predetermined shape is weak as compared with the part other than the cut surface, and the solid electrolyte is liable to adhere thereto in a small amount.

(7) In the masking part for insulating the anode part from the cathode part of the solid electrolytic capacitor and thereby preventing the solid electrolyte from extending to the anode part, the solid electrolyte is liable to fail in satisfactorily adhering and the capacitance is disadvantageously reduced. Furthermore, the masking part works out to a part of joining anodes in stacking the solid electrolytic capacitor devices and therefore, this part is readily subject to a stress, as a result, a large leakage current is generated and short circuit readily takes place.

(8) In the method of forming the solid electrolyte of an electrically conducting polymer through the dipping in a solution containing a monomer of organic polymer and in a solution containing an oxidizing agent, as described above, the amount of the solid electrolyte adhered is liable to be large in the center part of the substrate (aluminum foil) and small at the cut end part on the cut surface and at the masking part. Furthermore, the balance in the adhering state between the oxidizing agent and the monomer is readily lost to fail in obtaining a polymer having constant performance.

DISCLOSURE OF THE INVENTION

As a result of extensive investigations for forming a solid electrolyte at the cut end part and in the masking boundary region while taking account of the above-described problems, the present inventors have found that the solid electrolyte can be formed in an increased amount particularly on the cut surface and in the masking boundary region by gradually vaporizing the solvent of an oxidizing agent solution on the substrate and polymerizing a monomer on the remaining oxidizing agent. The solid electrolytic capacitor obtained as such is verified to show improved adhesion between the dielectric layer and the solid electrolyte formed on the dielectric film and to have excellent stability in various basic properties such as capacitance, dielectric loss (tan δ), leakage current and short circuit defective ratio, and also in the reflow soldering heat resistance and the moisture resistance load characteristics.

Furthermore, in the method where the solid electrolytic capacitor having the excellent properties as described above is produced by dipping the substrate into monomer solution of organic polymer or dispersant (hereinafter it is referred to simply as a solution containing a monomer) and solution of an oxidizing agent or dispersant (hereinafter it is referred to simply as a solution containing an oxidizing agent), the present inventors have found that for reducing the elution of the monomer into the solution containing an oxidizing agent or the elution of the solution containing an oxidizing agent into the solution containing a monomer, it is effective to control the dipping time in the solution containing an oxidizing agent or in the solution containing a monomer and also to control the polymerization time by adding a drying step at a predetermined temperature for a predetermined time after the dipping in the solution containing a monomer. Furthermore, it has been found that when the washing is performed at the final stage after the alternate dipping in the solution containing a monomer and in the solution containing an oxidizing agent, the drying and the polymerization are repeated a predetermined number of times, the overlapping between layers can be maintained and the solid electrolyte formed can have excellent properties.

The present invention provides a solid electrolytic capacitor and a method for producing the solid electrolytic capacitor as described below.

1. A solid electrolytic capacitor comprising a porous valve-acting metal substrate having on the surface thereof a dielectric film and having provided on the dielectric film a solid electrolyte of an electrically conducting polymer obtainable by oxidation-polymerizing a monomer of organic polymer using an oxidizing agent, wherein the thickness of the solid electrolyte layer in the peripheral part of the substrate is larger than the thickness of the solid electrolyte layer in the center part of the substrate.

2. A solid electrolytic capacitor comprising a porous valve-acting metal substrate having on the surface thereof a dielectric film and having provided on the dielectric film a solid electrolyte of an electrically conducting polymer obtainable by oxidation-polymerizing a monomer of organic polymer using an oxidizing agent, said valve-acting metal porous substrate being cut into a predetermined shape, wherein the thickness of the solid electrolyte layer in the periphery of the cut surface of the substrate is larger than the thickness of the solid electrolyte layer in the center part of the substrate.

3. A solid electrolytic capacitor comprising a porous valve-acting metal substrate having on the surface thereof a dielectric film and having provided on the dielectric film a solid electrolyte of an electrically conducting polymer obtainable by oxidation-polymerizing a monomer of organic polymer using an oxidizing agent, said valve-acting metal porous substrate being cut into a predetermined shape, wherein the thickness of the solid electrolyte layer in the periphery of the cut surface of the substrate and in the masking boundary part is larger than the thickness of the solid electrolyte layer in the center part of the substrate.

4. The solid electrolytic capacitor as described in any one of 1 to 3 above, wherein the partiality in the thickness of said solid electrolyte is created by the solution chemical oxidative polymerization or vapor phase chemical oxidative polymerization of a monomer of organic polymer performed on said valve-acting metal substrate having thereon a dielectric film.

5. The solid electrolytic capacitor as described in 4 above, wherein the partiality in the thickness of said solid electrolyte is created by repeating an operation of alternately dipping said valve-acting metal substrate having thereon a dielectric film in a solution containing a monomer of organic polymer and in a solution containing an oxidizing agent.

6. The solid electrolytic capacitor as described in any one of 1 to 5 above, wherein the porous valve-acting metal substrate has a plate- or foil-like shape.

7. The solid electrolytic capacitor as described in 6 above, wherein the solid electrolyte is formed such that the center part of the porous valve-acting metal substrate has a guitar- or gourd-like cross section in the longitudinal direction and in the transverse direction.

8. The solid electrolytic capacitor as described in 7 above, wherein in the cross section of the center part of the substrate on which a solid electrolyte layer is formed, the difference between the maximum thickness and the minimum thickness is from 0 to 200 $\mu$m.

9. The solid electrolytic capacitor as described in any one of 1 to 8 above, wherein the porous valve-acting metal is a simple metal selected from aluminum, tantalum, niobium and titanium, or an alloy thereof.

10. The solid electrolytic capacitor as described in any one of 1 to 9 above, wherein the monomer of organic polymer for forming the electrically conducting polymer is a compound containing a 5-member heterocyclic ring, or a compound having an aniline skeleton.

11. The solid electrolytic capacitor as described in 10 above, wherein the compound containing a 5-member heterocyclic ring is a compound having a thiophene skeleton or a polycyclic sulfide skeleton.

12. The solid electrolytic capacitor as described in 11 above, wherein the monomer compound having a thiophene skeleton is 3-ethylthiophene, 3-hexylthiophene, 3,4-dimethylthiophene, 3,4-methylenedioxythiophene, and 3,4-ethylenedioxythiophene.

13. A solid electrolytic multilayer capacitor obtainable by stacking a plurality of sheets of the solid electrolytic capacitor as described in 1 to 12 above.

14. A method for producing a solid electrolytic capacitor, comprising providing a solid electrolyte of an electrically conducting polymer on a dielectric film on the surface of a porous valve-acting metal substrate by the oxidative polymerization of a monomer of organic polymer using an oxidizing agent, wherein the solid electrolyte layer is formed such that the thickness in the peripheral part of the substrate is larger than the thickness in the center part of the substrate.

15. The method for producing a solid electrolytic capacitor as described in 14 above, wherein the partiality in the thickness of said solid electrolyte is created by the solution chemical oxidative polymerization or vapor phase chemical oxidative polymerization of a monomer of organic polymer performed on said valve-acting metal substrate having thereon a dielectric film.

16. The method for producing a solid electrolytic capacitor as described in 15 above, wherein the partiality of the thickness of said solid electrolyte is created by repeating an operation of alternately dipping said valve-acting metal substrate having thereon a dielectric film in a solution containing a monomer of organic polymer and in a solution containing an oxidizing agent.

17. The method for producing a solid electrolytic capacitor as described in 16 above, wherein the substrate is alternately dipped in a each solution for less than 5 minutes.

18. The method for producing a solid electrolytic capacitor as described in 16 above, wherein the alternate dipping is repeated from 15 to 30 times.

19. The method for producing a solid electrolytic capacitor as described in 16 above, wherein said valve acting metal substrate is left standing in air for from 5 seconds to 15 minutes after the dipping in the solution containing a monomer.

20. The method for producing a solid electrolytic capacitor as described in 16 above, wherein said valve acting metal substrate is left standing in air for from 10 seconds to 15 minutes after the dipping in said solution containing an oxidizing agent.

21. The method for producing a solid electrolytic capacitor as described in 19 or 20 above, wherein said valve acting metal substrate is left standing in air at a temperature of 0 to 60° C.

22. The method for producing a solid electrolytic capacitor as described in 16 above, wherein after the step of dipping said valve acting metal substrate alternately in the solution containing a monomer and in the solution containing an oxidizing agent to perform the polymerization, said valve acting metal substrate is washed.

23. A method for producing a solid electrolytic capacitor, comprising forming a solid electrolyte layer of an electrically conducting polymer on the surface of a valve acting metal substrate having thereon a dielectric film porous body, using solution containing a monomer capable of forming an electrically conducting polymer under the action of an oxidizing agent, and a solution containing an oxidizing agent, which has a step of dipping said valve acting metal substrate alternately in the solution containing a monomer and in the solution containing an oxidizing agent each for less than 5 minutes to perform the polymerization.

24. A method for producing a solid electrolytic capacitor, comprising forming a solid electrolyte layer of an electrically conducting polymer on the surface of a valve acting metal substrate having thereon a dielectric film porous body, using a solution containing a monomer capable of forming an electrically conducting polymer under the action of an oxidizing agent, and a solution containing an oxidizing agent, wherein a step of dipping said valve acting metal substrate alternately in the solution containing a monomer and in the solution containing an oxidizing agent each for less than 5 minutes is repeated from 15 to 30 times to perform the polymerization.

25. The method for producing a solid electrolytic capacitor as described in 23 or 24 above, wherein said valve acting metal substrate is left standing in air for from 5 seconds to 15 minutes after the dipping in the solution containing a monomer.

26. The method for producing a solid electrolytic capacitor as described in any one of 23 to 25 above, wherein said valve acting metal substrate is left standing in air for from 10 seconds to 15 minutes after the dipping in said solution containing an oxidizing agent.

27. The method for producing a solid electrolytic capacitor as described in 25 or 26 above, wherein said valve acting metal substrate is left standing in air at a temperature of 0 to 60° C.

28. The method for producing a solid electrolytic capacitor as described in any one of 23 to 27 above, wherein after repeating the step of performing polymerization, said valve acting metal substrate is washed.

29. The method for producing a solid electrolytic capacitor as described in any one of 23 to 28 above, wherein a part of the solid electrolyte layer formed of an electrically conducting polymer has a lamellar structure or a fibril structure.

30. The method for producing a solid electrolytic capacitor as described in any one of 23 to 29 above, wherein the monomer for forming an electrically conducting polymer is a compound containing a heterocyclic 5-membered ring.

31. The method for producing a solid electrolytic capacitor as described in any one of 23 to 30 above, wherein the monomer for forming an electrically conducting polymer is a compound having an aniline skeleton.

32. The method for producing a solid electrolytic capacitor as described in 30 above, wherein the compound containing a heterocyclic 5-membered ring has a thiophene skeleton.

33. The method for producing a solid electrolytic capacitor as described in 30 above, wherein the monomer for forming an electrically conducting polymer is selected from the group consisting of 3-ethylthiophene, 3-hexylthiophene, 3,4-dimethylthiophene, 3,4-methylenedioxythiophene, 3,4-ethylenedioxythiophene, 1,3-dihydroisothianaphthene, and 3,4-ethylenedioxyfurane.

34. The method for producing a solid electrolytic capacitor as described in any of 23 to 33 above, wherein said valve acting metal is a single metal selected from aluminum, tantalum, niobium and titanium, or an alloy thereof.

35. A solid electrolytic capacitor obtained by the production method described in 23 above.

36. A solid electrolytic capacitor obtained by the production method described in 24 above.

37. A solid electrolytic capacitor obtained by the production method described in any one of 25 to 34 above.

DETAILED DESCRIPTION OF THE INVENTION

Figure 1:
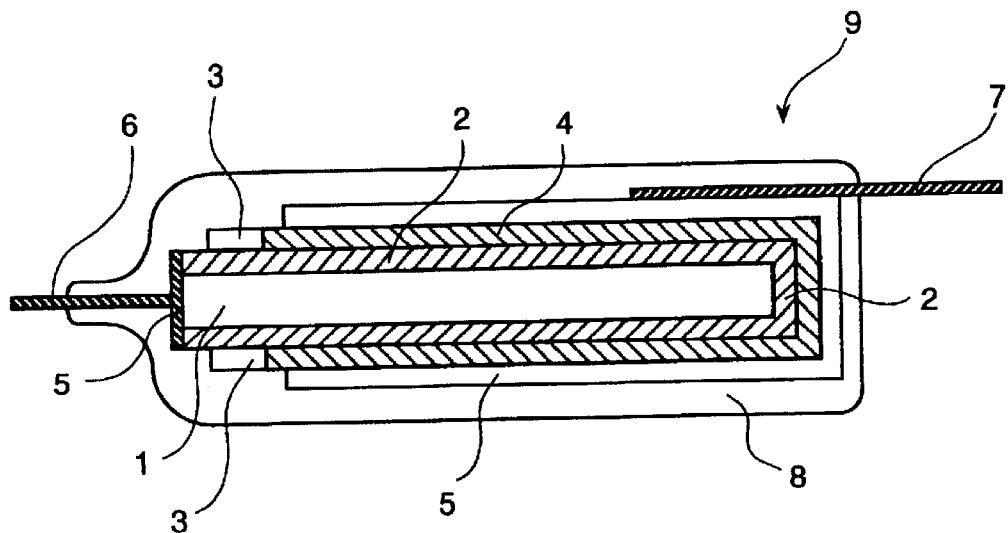
FIG. 1 is a cross section of a capacitor device.

The dielectric film on the surface of a substrate for use in the present invention is usually formed by subjecting a porous metal molded material having valve action to an electrochemical forming treatment or the like.

The forming solution and the conditions (e.g., forming voltage) for use in the electrochemical forming treatment are previously verified and optimally decided according to the capacitance, voltage resistance and the like required for the solid electrolytic capacitor produced. In performing the electrochemical forming treatment, a masking is generally provided for preventing the forming solution from bleeding up to the portion which works out to the anode of the solid electrolytic capacitor and at the same time, for ensuring the insulation of the anode from the solid electrolyte (cathode part) which is formed in the later step.

The masking material is not limited and a general heat-resistant resin may be used and a composition comprising a solvent-soluble or swellable heat-resistant resin or a precursor thereof, an inorganic powder and a cellulose-based resin (see, JP-A-11-80596) is preferably used. Specific examples thereof include polyphenylsulfone (PPS), polyethersulfone (PES), cyanic ester resin, fluororesin (e.g., tetrafluoroethylene, tetrafluoroethylene-perfluoroalkyl vinyl ether copolymer), low molecular polyimide, and derivatives and precursors thereof. Among these, preferred are low molecular polyimide, polyethersulfone, fluororesin, and precursors thereof.

In general, for forming an electrically conducting polymer on an oxide dielectric film, a method of forming an electrically conductive polymer layer by vapor phase polymerization or electrolytic polymerization (see, JP-A-3-6217), a solution chemical polymerization of adhering a monomer of organic polymer on an oxide dielectric film and polymerizing the monomer in an oxidizing agent solution (see, JP-A-11-251191), and an electrolytic polymerization method of changing the feeding point to the anode body at predetermined intervals using a switching device and thereby equalizing the thickness of the electrically conducting polymer layer (see, JP-A-11-283878) may be used. In the present invention, a method of subjecting a monomer of organic polymer to a solution chemical oxidative polymerization treatment containing a step of dipping a porous valve-acting metal substrate in an oxidizing solution and drying it to gradually increase the concentration of the oxidizing agent solution on the substrate, and a vapor phase chemical oxidative polymerization are preferably used. Among these, the solution chemical oxidative polymerization method is more preferred.

In producing the solid electrolyte by the vapor phase chemical oxidative polymerization which is one example of the present invention, the partial pressure of a monomer (in the case of introducing the monomer as a mixed gas) and the pressure (in the case of introducing the gas under controlled pressure) vary depending on the kind of the substituent of the compound or the kind of the solvent or the like, however, the pressure is generally preferably from $10^{-3}$ to 10 atm, more preferably from $10^{-2}$ to 5 atm.

The reaction temperature at the vapor phase chemical oxidative polymerization is decided by the kind and concentration of each compound having the polymerization initiating ability and the partial pressure (pressure) of the polymerizable monomer and is not particularly limited, however, the reaction temperature is generally from −70 to 250° C., preferably from 0 to 150° C., more preferably from 15 to 100° C.

According to the present invention, as described in Examples later, an aluminum foil having thereon an oxide dielectric film is dipped, for example, in an isopropyl alcohol (IPA) solution of 3,4-ethylenedioxythiophene (EDT), air-dried to mostly remove the IPA, dipped in an aqueous solution containing about 20% by mass of an oxidizing agent (ammonium persulfate) and then heated at about 40° C. for 10 minutes, or this procedure is repeated, whereby a polymer of poly(3,4-ethylenedioxythiophene) can be obtained in such a state that the thickness of the solid electrolyte layer is larger in the periphery of the substrate than in the center part.

The reason why this partiality in the thickness of the solid electrolyte layer is created, is not elucidated in detail, however, it is presumed that the condition under heating at about 40° C. provides an environment of readily causing dissipation of the moisture on the dielectric film having a large surface area, the oxidizing agent solution moves to the cut surface (cut end part) of the substrate and to the masking part due to capillarity, water gradually evaporates there from the oxidizing agent solution to give a high concentration, and a monomer contacts with this and polymerizes to allow the polymer to adhere to the cut end part and in the vicinity of the masking boundary region in a large amount, as a result, the thickness of the solid electrolyte in the periphery of the substrate becomes larger than the thickness of the solid electrolyte layer in the center part of the substrate.

In other words, the main factor of forming a solid electrolyte having a guitar- or gourd-like cross section in the longitudinal direction and in the transverse direction at the center part of the porous valve-acting metal substrate, which is a characteristic feature of the solid electrolytic capacitor of the present invention, is the mode of forming a polymer, where the oxidizing solution is concentrated to a high concentration on the cut surface (cut end part) and in the masking part due to the relation between the surface tension and the osmotic pressure of the formed porous body and the polymer is allowed to deposit there. This polymer formation mode at the edge part seems to lead to the success in gaining preferred properties, namely, reduction in the short circuit defective ratio of solid electrolytic capacitors and in the leakage current.

The partiality in the thickness of the solid electrolyte layer varies depending on the conditions in forming the solid electrolyte, such as the repetition number of an operation of dipping the valve-acting metal substrate in a solution containing a monomer of organic polymer and in a solution containing an oxidizing agent, however, for obtaining preferred solid electrolytic capacitor characteristics, the difference between the maximum thickness and the minimum thickness is from 0 to 200 $\mu$m, preferably from 0 to 180 $\mu$m, more preferably from 0 to 150 $\mu$m, in the cross section of the center part of the substrate on which a solid electrolyte layer is formed.

The solid electrolyte layer of an electrically conducting polymer obtained by the method of the present invention has a fibril structure or a lamella (thin layer-like) structure. These structures have widespread overlapping among the polymer chains that enables electron transfer between polymers and this is considered to contribute to the improvement in the electric conductivity and in the properties such as low impedance.

According to the solution chemical polymerization method, a monomer is attached onto a dielectric film having microfine pores of an anode substrate, oxidative polymerization thereof is induced by the action of an oxidizing agent and water in air in the presence of a compound which can work out to a dopant of the electrically conducting polymer, and the polymer composition produced on the dielectric surface forms a solid electrolyte. At this time, for forming a good polymer composition, each dipping time in (namely, each impregnation time with) the solution containing a monomer and in the solution containing an oxidizing agent must be adjusted to control the amount of the monomer attached and the amount of the oxidizing agent attached. For example, if the dipping time is too long, the polymerization reaction cannot be completed and the polymer composition obtained is liable to have a low molecular weight. If the dipping time in the solution containing an oxidizing agent having an unsaturated concentration is too long, the oxidizing agent attached to the metal foil substrate during the passing through the previous steps including the drying step re-dissolves and at the same time, the monomer attached or the polymer produced is also eluted or flows out, as a result, not only the producing of the polymer is retarded but also the solution containing an oxidizing agent is contaminated with the effluent. The same may occur in the case of the dipping in the solution containing a monomer.

With respect to the phenomenon brought about, for example, coloration of the solution containing an oxidizing agent or solution containing a monomer due to low molecular weight components, suspension of the polymerized matter, liability toward the reduction in the weight of the adhered and formed solid electrolyte, and change in the viscosity or specific gravity of the solution containing a monomer may occur.

Accordingly, in the method of the present invention, the time spent for each dipping in the solution containing a monomer and in the solution containing an oxidizing agent is specified to be from a time sufficiently long to allow the monomer component or the oxidizing agent component in the solution containing the component to adhere to the dielectric surface of the metal foil substrate to a time less than 5 minutes, preferably from 0.1 seconds to 2 minutes, more preferably from 1 second to 1 minute.

After the impregnation with the solution containing a monomer, the substrate must be left standing in air for a predetermined time to vaporize the solvent and thereby uniformly attach the monomer onto the dielectric surface and also onto the polymer composition. The conditions for this standing vary depending on the kind of solvent. Generally, the standing temperature is from about 0° C. to the boiling point of the solvent and the standing time is approximately from 5 seconds to 15 minutes. For example, in the case of an alcohol-type solvent, standing of 5 minutes or less may be sufficient. By this standing, the monomer can uniformly adhere to the dielectric surface and at the subsequent dipping in the solution containing an oxidizing agent, the contamination may be reduced.

After the dipping in the solution containing a monomer and in the solution containing an oxidizing agent, the metal foil substrate is kept in air at a constant temperature for a predetermined time to oxidation-polymerize the monomer.

The polymerization temperature varies depending on the kind of the monomer, however, for example, in the case of pyrrole, the polymerization temperature is 5° C. or less and in the case of a thiophene-type monomer, it is from about 30° C. to about 60° C.

The polymerization time depends on the amount of the monomer attached at the dipping. The amount of the monomer attached varies depending on the concentration or viscosity of each solution containing the monomer or oxidizing agent and cannot be indiscriminately specified. However, in general, when the amount of the monomer attached per once is reduced, the polymerization time can be shortened, whereas when the amount of the monomer attached per once is increased, the polymerization takes a long time.

In the method of the present invention, the polymerization time per once is from 10 seconds to 15 minutes, preferably from 3 to 10 minutes.

The electrically conducting polymer layer formed directly on the dielectric film according to the method of the present invention is confirmed to have a lamella structure or a fibril structure on the photograph taken through an electron microscope.

The lamella structure and the fibril structure of the electrically conducting polymer are considered to contribute to the improvement of the one-dimensional property of the polymer chain, which is one of the factors of increasing the electric conductivity, and also to the widespread overlapping among the polymer chains. Furthermore, these structures seem to have an advantageous effect on the increase of electrical conductivity of the polymer solid electrolyte and on the improvement of the capacitor properties, such as reduction of the impedance.

In the method of the present invention, the dipping frequency must be controlled so that the electrically conducting polymer compound can be formed to have a thickness large enough to ensure the resistance against moisture, heat, stress and the like. A desired solid electrolyte layer may be easily formed by repeating the above-described production process 15 times or more, preferably from 20 to 30 times, per one anode substrate.

The step for forming a solid electrolyte for use in a solid electrolytic capacitor is a step of alternately dipping the anode body obtained by forming a dielectric film on a valve acting metal in a solution containing a monomer and in a solution containing an oxidizing agent to repeatedly and alternately attach the monomer and the oxidizing agent to the anode body, and allowing the chemical oxidation polymerization to proceed in air.

At this time, the chemical oxidation polymerization for forming an electrically conducting polymer layer containing as a repeating unit the monomer or a derivative thereof is performed by setting the humidity condition in the atmosphere to from 10% to less than 80%, preferably from 15% to less than 60%, more preferably from 20% to less than 50%.

The temperature and the pressure in the atmosphere vary depending on the kind and the polymerization method of the polymer composition and cannot be indiscriminately specified, however, in general, the temperature is preferably in the range from −70° C. to 250° C. and the pressure is preferably an atmospheric pressure or lower.

The concentration of the solution containing a monomer is from 3 to 50 mass %, preferably from 5 to 35 mass %, more preferably from 10 to 25 mass %. The concentration of the solution containing an oxidizing agent is from 5 to 70 mass %, preferably from 15 to 50 mass %. The solution containing a monomer and the solution containing an oxidizing agent each has a viscosity of 100 cP (centipoise) or less, preferably 30 cP or less, more preferably from 0.6 to 10 cP.

According to the present invention, a solid electrolyte formed of an electrically conducting polymer having a layer structure (lamellar structure or fibril structure) can be obtained by the alternate dipping in the solution containing a monomer and in the solution containing an oxidizing agent. However, in order to improve the one-dimensional property of the polymer chain in the layer and generate overlapping among the polymer chains, it has been found preferred not to perform the washing every each polymerization but perform the washing at the final stage. By doing so, the excess (unreacted) monomer remaining unreacted in the polymerization step can be polymerized in the next step, as a result, a solid electrolyte comprising an electrically conducting polymer having a layer structure favored with widespread overlapping can be formed.

In the solid electrolyte having a lamellar structure or a fibril structure, which is obtained by the method of the present invention and covering the outer surface of the anode body, relatively continuous or independent spaces are generated and this space has a function to relieve the effect of thermal stress, mechanical stress and the like imposed during the production process of a capacitor, such as molding. This can be said to be a useful structure capable of coping with not only the stresses imposed during the production process but also various stresses coming down from the environment where the capacitor is actually used.

In one preferred embodiment of the present invention, the process for forming a solid electrolyte includes a step of dipping a valve acting metal anode foil having formed thereon the above-described dielectric film layer in a solution containing an oxidizing agent (Solution 1) and a step of dipping it in a solution containing a monomer and a dopant (Solution 2). With respect to the order of dipping operations, an order of dipping the valve acting metal anode foil in Solution 1 and then dipping it in Solution 2 (regular order) may be used or an order reversed thereto of dipping the valve acting metal anode foil in Solution 2 and then dipping it in Solution 1 may also be used.

In another embodiment, the process may include a step of dipping the anode foil in a solution containing an oxidizing agent and a dopant (Solution 3) and a step of dipping it in a solution containing a monomer (Solution 4). Also in this case, an order of dipping the anode foil in Solution 3 and then dipping it in Solution 4 (regular order) or an order reversed thereto of dipping the anode foil in Solution 4 and then dipping it in Solution 3 may be used. Solutions 1 to 4 each may be used in the state of suspension. Furthermore, the dipping may be replaced by the coating.

The solvents in Solutions 1 to 4 may be the same or different solvent systems may be used, if desired. Depending on the kind of solvent, a drying step may be separately interposed between Solution 1 and Solution 2 or between Solution 3 and Solution 4. Furthermore, washing with a solvent may be performed after the formation of the solid electrolyte.

The metal having valve action, which can be used in the present invention, is a simple metal such as aluminum, tantalum, niobium, titanium, zirconium, magnesium and silicon, or an alloy thereof. The metal may have any shape as long as it is in the form of a porous molded material such as an etched product of rolled foil or a sintered body of fine powder.

For the anode substrate, a porous sintered body of the above-described metal, a plate (including ribbon, foil and the like) surface-treated, for example, by etching, a wire and the like may be used, however, a plate and a foil are preferred. On the surface of this metal porous body, an oxide dielectric film is formed and a known method may be used therefor. For example, in the case of using a sintered body of tantalum powder, the oxide film may be formed on the sintered body by the anodization in an aqueous phosphoric acid solution.

The thickness of the valve-acting metal foil varies depending on the use end, however, in general, a foil having a thickness of about 40 to about 150 $\mu$m is used. The size and the shape of the valve-acting metal foil also vary depending on the use end, however, the metal foil as a plate-like device unit preferably has a rectangular form having a width of about 1 to about 50 mm and a length of about 1 to about 50 mm, more preferably a width of about 2 to about 15 mm and a length of about 2 to about 25 mm.

Examples of the aqueous solution-type oxidizing agent which can be used for the formation of the solid electrolyte in the present invention include peroxodisulfuric acid and Na, K and $NH_4$ salts thereof, cerium(IV) nitrate, ammonium cerium(IV) nitrate, iron(III) sulfate, iron(III) nitrate and iron(III) chloride. Examples of the organic solvent-type oxidizing agent include ferric salts of an organic sulfonic acid, such as iron(III) dodecylbenzenesulfonate and iron(III) p-toluenesulfonate. Examples of the organic solvent used here include γ-butyrolactone and monohydric alcohols such as butanol and isopropanol. The concentration of the oxidizing agent solution is preferably from 5 to 50% by mass and the temperature of the oxidizing agent solution is preferably from −15 to 60° C.

The electrically conducting polymer constituting the solid electrolyte for use in the present invention is a polymer of an organic high molecular monomer having a π electron-conjugate structure and the polymerization degree thereof is from 2 to 2,000, more preferably from 5 to 1,000. Specific examples thereof include electrically conducting polymers containing as a repeating unit a structure shown by a compound having a thiophene skeleton, a compound having a polycyclic sulfide skeleton, a compound having a pyrrole skeleton, a compound having a furan skeleton or a compound having an aniline skeleton, however, the electrically conducting polymer is not limited thereto.

With respect to the monomer compound used as a starting material of the electrically conducting polymer, examples of the compound having a thiophene skeleton include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds may be a compound generally available on the market or may be prepared by a known method (a method described, for example, in *Synthetic Metals*, Vol. 15, page 169 (1986)), however, the present invention is not limited thereto.

Specific examples of the monomer compound having a polycyclic sulfide skeleton include compounds having a 1,3-dihydro-polycyclic sulfide (also called 1,3-dihydrobenzo-[c]thiophene) skeleton and compounds having a 1,3-dihydronaphtho[2,3-c]thiophene skeleton. Furthermore, compounds having a 1,3-dihydroanthra [2,3-c] thiophene skeleton and compounds having a 1,3-dihydronaphthaceno [2,3-c]thiophene skeleton may be used. These compounds may be prepared by a known method, for example, by the method described in JP-A-8-3156.

In addition, compounds having a 1,3-dihydronaphtho[1,2-c]thiophene skeleton such as 1,3-dihydrophenanthra[2,3-c]thiophene derivatives, and compounds having a 1,3-dihydrotriphenylo[2,3-c]thiophene skeleton such as 1,3-dihydrobenzo[a]anthraceno[7,8-c]thiophene derivatives, may also be used.

A compound arbitrarily containing nitrogen or N-oxide in the condensed ring may also be used and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the monomer compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. These compounds may be a commercially available compound or may be prepared by a known method, however the present invention is not limited thereto.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds may be a commercially available compound or may be prepared by a known method, however the present invention is not limited thereto.

Examples of the compound having an aniline skeleton include derivatives such as 2-methylaniline, 2-ethylaniline, 2-propylaniline, 2-butylaniline, 2-pentylaniline, 2-hexylaniline, 2-heptylaniline, 2-octylaniline, 2-nonylanilin, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline and 2,3-ethylenedioxyaniline. These compounds may be a commercially available product or may be prepared by a known method, however, the present invention is not limited thereto.

Among these, the compounds having a thiophene skeleton or a polycyclic sulfide skeleton are preferred, and 3,4-ethylenedioxythiphene (EDT) and 1,3-dihydroisothianaphthene are more preferred.

The solvent for the monomer of organic polymer is preferably a monohydric alcohol (e.g., methyl alcohol, ethyl alcohol, n-propyl alcohol, isopropyl alcohol, n-butyl alcohol, isobutyl alcohol, tert-butyl alcohol). The monomer solution may have any monomer concentration without limitation.

The conditions for the polymerization of the compound selected from the group consisting of the above-described compounds are not particularly limited and the polymerization may be easily performed after previously confirming the preferred conditions by a simple test.

The compounds selected from the group consisting of the above-described compounds may also be used in combination and the solid electrolyte may be formed as a copolymer. In this case, the composition ratio and the like of polymerizable monomers depend on the polymerization conditions and the preferred composition ratio and polymerization conditions may be confirmed by a simple test.

For example, a method where an EDT monomer and an oxidizing agent each preferably in the form of a solution are coated separately one after another or coated simultaneously on an oxide film layer of a metal foil to form a solid electrolyte (see, JP-A-2-15611 and JP-A-10-32145), may be used. 3,4-Ethylenedioxythiophene (EDT) which is preferably used in the present invention is well soluble in the above-described monohydric alcohol but low in the affinity for water, therefore, on contacting with an aqueous oxidizing agent solution of high concentration, the polymerization of EDT aggressively proceeds on the interface thereof and an electrically conducting polymer solid electrolyte layer having a fibril structure or a lamella (thin layer-like) structure is formed.

Examples of the solvent for the solutions used in the production method of the present invention and the solvent for washing after the formation of the solid electrolyte include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidone (NMP) and dimethylsulfoxide (DMSO); esters such as ethyl acetate and butyl acetate; non-aromatic chlorine-based solvents such as chloroform and methylene chloride; nitro compounds such as nitromethane, nitroethane and nitrobenzene; alcohols such as methanol, ethanol and propanol; organic acids such as formic acid, acetic acid and propionic acid; acid anhydrides of the organic acid (e.g., acetic anhydride); water; and mixed solvents thereof. Among these, preferred are water, alcohols, ketones and mixed systems thereof.

The electrically conducting polymer for use in the present invention uses an arylsulfonic acid-based dopant. Examples of the starting material for dopant, which can be used, include salts of benzenesulfonic acid, toluenesulfonic acid, naphthalenesulfonic acid, anthracenesulfonic acid, anthraquionenesulfonic acid and the like.

The thus-produced solid electrolyte has an electric conductivity of about 0.1 to about 200 S/cm, preferably from about 1 to about 150 S/cm, more preferably from about 10 to about 100 S/cm.

On the electrically conducting polymer composition layer formed, an electrically conducting layer is preferably provided so as to attain good electric contact with the cathode lead. For example, an electrically conducting paste is solidified, a metal is plated or deposited, or an electrically conducting resin film is formed.

Usually, multiple sheets of the thus-obtained solid electrolytic capacitor devices are stacked to have a desired capacitance and after connecting a lead, the stacked body is applied with a jacket using resin molding, a resin case, a metal-made jacket case or resin dipping, thereby completing a capacitor product for various uses.

BEST MODE FOR CARRYING OUT THE INVENTION

The present invention is described in detail below by referring to the Examples, however, the present invention should not be construed as being limited thereto.

EXAMPLE 1

An etched aluminum foil was cut into a size of 3 mm×10 mm and a polyimide solution was circumferentially coated on both surfaces in a width of 1 mm to divide the surface into a 4-mm portion and a 5-mm portion in the long axis direction, and then dried to form a masking. The 3 mm×4 mm portion of this etched aluminum forming foil was electrochemically formed with an aqueous 10% by mass ammonium adipate solution by applying a voltage of 13 V, as a result, an oxide dielectric film was formed at the cut end part. Thereafter, this 3 mm×4 mm portion of the aluminum foil was dipped in 1.2 mol/L of an isopropyl alcohol (IPA) solution having dissolved therein 5 g of 3,4-ethylenedioxythiophene (produced by Bayer AG) for 5 seconds, dried at room temperature for 5 minutes, and then dipped in 2 mol/L of an aqueous ammonium persulfate solution having suspended therein sodium anthraquinone-2-sulfonate to a concentration of 0.07% by mass, for 5 seconds. Subsequently, this aluminum foil was left standing in an atmosphere at 40° C. for 10 minutes to allow the oxidation polymerization to proceed. By repeating the dipping step and the polymerization step 25 times in total, a solid electrolyte layer of an electrically conducting polymer was formed on the outer surface of the etched aluminum foil. The finally produced poly(3,4-ethylenedioxythiophene) was washed with warm water at 50° C. and then dried at 100° C. for 30 minutes to complete the formation of the solid electrolyte layer.

Using a thicknessmeter (manufactured by Peacock Corp.: Digitaldial Gage DG-205 (accuracy of 3 μm)), the thickness was measured by slowly putting the aluminum foil into the measuring part of the thicknessmeter.

Figure 2:
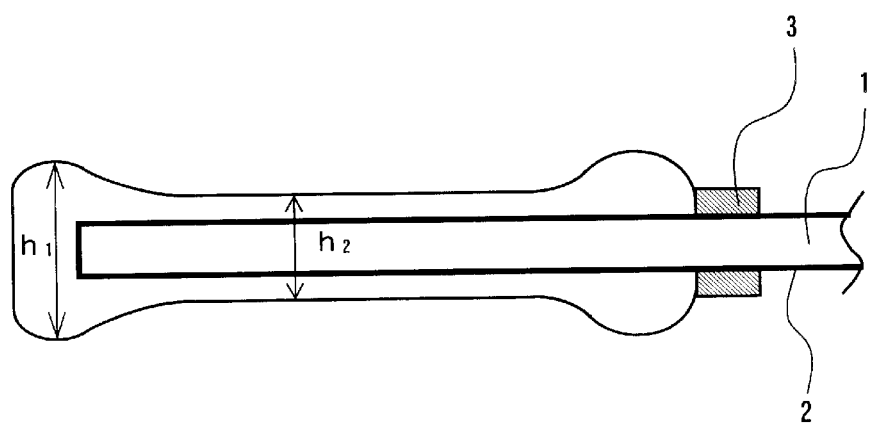
FIG. 2 is a schematic longitudinal cross section of a capacitor device material of Example 1.
Figure 3:
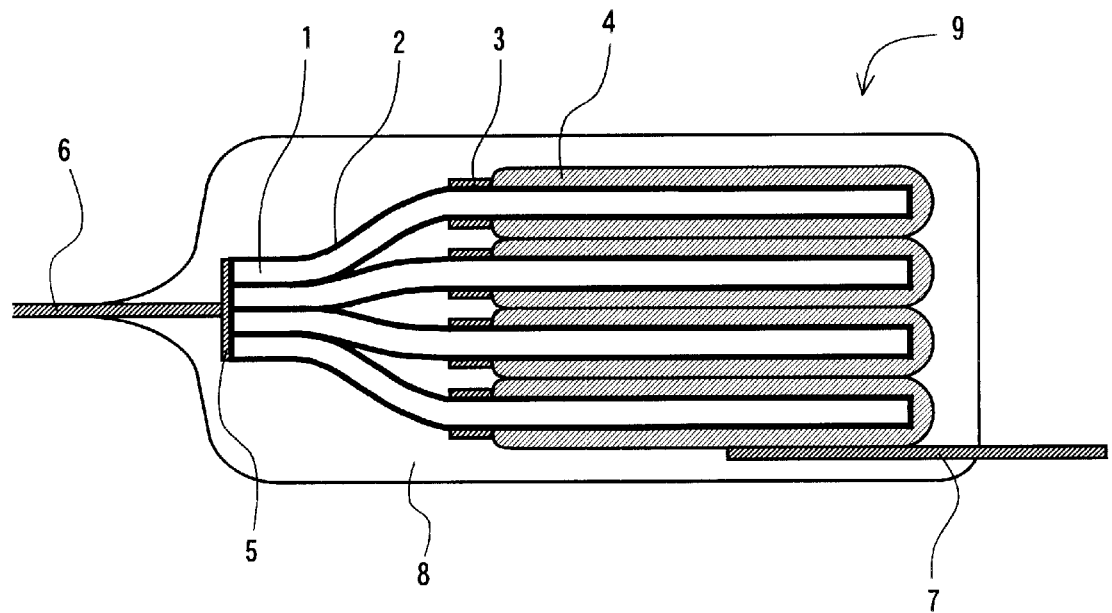
FIG. 3 is a cross section of a solid electrolytic capacitor obtained by stacking the capacitor devices of Example 1.

As a result, the thickness ($h_1$) of the overhanging portion at the peripheral part shown in the schematic view of FIG. 2 was 260 μm, the thickness ($h_2$) of the constriction portion at the center part was 210 μm, and the difference ($h_1-h_2$) in the film thickness was 50 μm.

Then, carbon paste and silver paste were applied to the aluminum foil in the portion where the electrically conducting polymer composition layer was formed. Four sheets of the thus-prepared aluminum foils were stacked and a cathode lead was connected thereto. To the portion where the electrically conducting polymer was not formed, an anode lead was connected by welding. The resulting device was molded with an epoxy resin and aged at 125° C. for 2 hours by applying thereto a rated voltage. In total, 30 units of capacitors were fabricated.

These 30 units of capacitors were measured on the capacitance and the loss factor (tan δ×100%) at 120 Hz as initial properties and also measured on the impedance at a resonance frequency and the leakage current. The leakage current was measured one minute after the rated voltage was applied. In Table 1, respective averages of these measured values, the defective ratio when a device having a leakage current of 0.59 μA (0.002 CV) or more is evaluated as a defective unit, and the number of short-circuited products are shown. The average of the leakage current values is a value calculated exclusive of defectives. In Table 2, the results in the reflow soldering test and the subsequent moisture resistance test are shown. In the moisture resistance test, a device having a leakage current of 11.8 μA (0.04 CV) or more was evaluated as a defective. The reflow soldering test was performed by passing the device through a temperature zone of 230° C. for 30 seconds and the moisture resistance test was performed by allowing the device to stand in high-temperature and high-humidity conditions of 85° C. and 85% RH for 240 hours.

EXAMPLE 2

30 Units of capacitors were fabricated in the same manner as in Example 1 except for using iron(III) sulfate in place of ammonium persulfate and using dihydroisothianaphthene in place of 3,4-ethylenedioxythiophene in Example 1.

The thickness of the overhanging part of the solid electrolyte layer was measured in the same manner as in Example 1 and found to be 250 μm, the thickness of the constriction portion at the center part was 200 μm, and the difference ($h_1-h_2$) in the film thickness was 50 μm.

These capacitor devices were evaluated on the properties in the same manner as in Example 1. The results obtained are shown in Tables 1 and 2.

EXAMPLE 3

30 Units of capacitors were fabricated in the same manner as in Example 1 except that pyrrole was used in place of 3,4-ethylenedioxythiophene in Example 1 and at this time, the pyrrole solution impregnated was dried at 3° C. for 5 minutes and thereafter, an oxidizing agent solution was impregnated to perform the polymerization at 5° C. for 10 minutes.

The thickness of the overhanging part of the solid electrolyte layer was measured in the same manner as in Example 1 and found to be 280 μm, the thickness of the constriction portion at the center part was 210 μm, and the difference ($h_1-h_2$) in the film thickness was 70 μm.

These capacitor devices were evaluated on the properties in the same manner as in Example 1. The results obtained are shown in Tables 1 and 2.

EXAMPLE 4

30 Units of capacitors were fabricated in the same manner as in Example 1 except for using furan in place of 3,4-ethylenedioxythiophene in Example 1.

The thickness of the overhanging part of the solid electrolyte layer was measured in the same manner as in Example 1 and found to be 260 μm, the thickness of the constriction portion at the center part was 200 μm, and the difference ($h_1-h_2$) in the film thickness was 60 μm.

These capacitor devices were evaluated on the properties in the same manner as in Example 1. The results obtained are shown in Tables 1 and 2.

EXAMPLE 5

30 Units of capacitors were fabricated in the same manner as in Example 1 except for using aniline in place of 3,4-ethylenedioxythiophene in Example 1.

The thickness of the overhanging part of the solid electrolyte layer was measured in the same manner as in Example 1 and found to be 270 μm, the thickness of the constriction portion at the center part was 210 μm, and the difference ($h_1-h_2$) in the film thickness was 60 μm.

These capacitor devices were evaluated on the properties in the same manner as in Example 1. The results obtained are shown in Tables 1 and 2.

COMPARATIVE EXAMPLE 1

3,4-Ethylenedioxythiophene (manufactured by Bayer AG) was dissolved in a 75% IPA solution of iron(III) dodecylbenzenesulfonate to an equimolar amount, and this solution was dropped or impregnated on the aluminum foil prepared in Example 1. Subsequently, this aluminum foil was left standing in an atmosphere at about 40° C. for about 60 minutes to allow the oxidative polymerization to proceed.

Using a thicknessmeter (manufactured by Peacock Corp.: Digitaldial Gage DG-205 (accuracy of 3 μm)), the thickness was measured by slowly putting the aluminum foil into the measuring part of the thicknessmeter.

Figure 4:
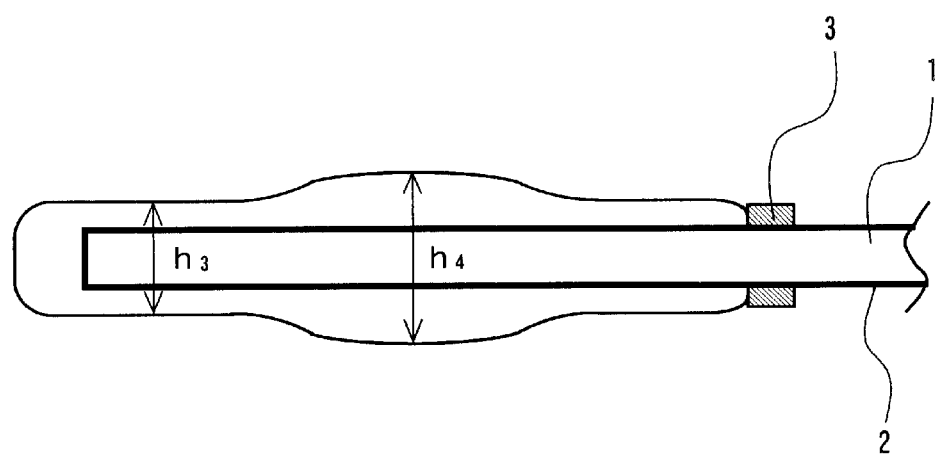
FIG. 4 is a schematic longitudinal cross section of a capacitor device material of Comparative Example 1.

As a result, the thickness ($h_3$) at the peripheral part shown in the schematic view of FIG. 4 was 230 μm, the thickness ($h_4$) of the overhanging part at the center part was 240 μm, and the difference ($h_3-h_4$) in the film thickness was $-10$ μm.

30 Units of capacitors were fabricated in the same manner as in Example 1 except for changing the polymerization method. These capacitor devices were evaluated on the properties in the same manner as in Example 1. The results obtained are shown in Tables 1 and 2.

TABLE 1

| | Initial Properties | | | | | |
|---|---|---|---|---|---|---|
| | Capacitance μF | Loss Factor % | Impedance mΩ | Leakage Current μA | Defective Ratio | Number of Short Circuit Units |
| Example 1 | 51.9 | 0.603 | 0.008 | 0.03 | 0/30 | 0 |
| Example 2 | 50.3 | 0.635 | 0.013 | 0.05 | 0/30 | 0 |
| Example 3 | 50.9 | 0.624 | 0.012 | 0.06 | 0/30 | 0 |
| Example 4 | 49.8 | 0.653 | 0.017 | 0.07 | 0/30 | 0 |
| Example 5 | 49.6 | 0.678 | 0.019 | 0.09 | 0/30 | 0 |
| Comparative Example 1 | 40.1 | 1.658 | 0.045 | 0.95 | 4/30 | 4 |

TABLE 2

| | Reflow Soldering Test | | Humidity Resistance Test | | |
|---|---|---|---|---|---|
| | Defective Ratio | Number of Short Circuit Units | Leakage Current | Defective Ratio | Number of Short Circuit Units |
| Example 1 | 0/30 | 0 | 0.49 | 0/30 | 0 |
| Example 2 | 0/30 | 0 | 0.54 | 0/30 | 0 |
| Example 3 | 0/30 | 0 | 0.59 | 0/30 | 0 |
| Example 4 | 0/30 | 0 | 0.57 | 0/30 | 0 |
| Example 5 | 0/30 | 0 | 0.61 | 0/30 | 0 |
| Comparative Example 1 | 3/26 | 3 | 2.10 | 3/23 | 1 |

From the results of examples 1 to 5 and comparative example 1, it is found out that the solid electrolytic capacitor having the thickness of solid electlyte layer on the peripheral part of the porous valve-acting metal substrate larger than the thickness on the center part has excellent stability in various fundamental properties such as capacitance, dielectric loss (tan δ), leakage current and short circuit defective ratio and also in the reflow soldering heat resistance and the moisture resistance load characteristics.

EXAMPLE 6

30 Units of capacitors were fabricated in the same manner as in Example 1 except for forming the solid electrolyte by dipping the aluminum foil in the oxidizing agent solution for 3 minutes. These capacitor devices were evaluated on the properties in the same manner as in Example 1. The results obtained are shown in Tables 3 and 4.

EXAMPLE 7

30 Units of capacitors were fabricated in the same manner as in Example 1 except for forming the solid electrolyte by dipping the aluminum foil in the oxidizing solution for 4 minutes in Example 1. These capacitor devices were evaluated on the properties in the same manner as in Example 1. The results obtained are shown in Tables 3 and 4.

EXAMPLE 8

30 Units of capacitors were fabricated in the same manner as in Example 1 except for forming the solid electrolyte by dipping the aluminum foil in the monomer solution for 4 minutes in Example 1. These capacitor devices were evaluated on the properties in the same manner as in Example 1. The results obtained are shown in Tables 3 and 4.

EXAMPLE 9

30 Units of capacitors were fabricated in the same manner as in Example 1 except for forming the solid electrolyte by repeating the dipping step and the polymerization step 20 times in Example 1. These capacitor devices were evaluated on the properties in the same manner as in Example 1. The results obtained are shown in Tables 3 and 4.

EXAMPLE 10

30 Units of capacitors were fabricated in the same manner as in Example 1 except for forming the solid electrolyte by repeating the dipping step and the polymerization step 28 times in Example 1. These capacitor devices were evaluated on the properties in the same manner as in Example 1. The results obtained are shown in Tables 3 and 4.

EXAMPLE 11

The 3mm×4mm portion of an etched aluminum foil on which dielectric film was formed as in example 1 was dipped in 1.5 mol/L of an aqueous ammonium persulfate solution having suspended therein sodium anthraquinone-2-sulfonate to a concentration of 0.05 mass %, for 5 seconds. Subsequently, this aluminum foil was left standing in a polymerization vessel heated at 60° C. and 3,4-ethylenedioxythiophene gas generated by heating at about 80° C. accompanied with nitrogen gas was introduced to the polymerizing vessel to allow the vapor phase chemical oxidative polymerization to proceed. Subsequently, this etched aluminum foil was left standing in an atmosphere at 40° C. for 10 minutes to dry. By repeating the dipping step and the polymerization step 15 times in total, a solid electrolyte layer of the electrically conducting polymer was formed on the outer surfaces of the etched aluminum foil. The finally produced polyer was washed with warm water at 70° C. and then dried at 100° C. for 30 minutes to complete the formation of the solid electrolyte layer.

The thickness of the overhanging part of the solid electrolyte layer ($h_1$) was measured in the same manner as in Example 1 and found to be 180 μm, the thickness of the constriction portion at the center part ($h_2$) was 130 μm, and the difference ($h_1-h_2$) in the film thickness was 50 μm.

Then 30 units of capacitors were fabricated. These capacitor devices were evaluated on the properties in the same manner as in Example 1. The results obtained are shown in Tables 3 and 4.

COMPARATIVE EXAMPLE 2

30 Units of capacitors were fabricated in the same manner as in Example 1 except for forming the solid electrolyte by repeating the dipping step and the polymerization step 10 times. These capacitor devices were evaluated on the properties in the same manner as in Example 1. The results obtained are shown in Tables 3 and 4.

COMPARATIVE EXAMPLE 3

30 Units of capacitors were fabricated in the same manner as in Example 1 except for forming the solid electrolyte by dipping the aluminum foil in the oxidizing solution for 10 minutes. These capacitor devices were evaluated on the properties in the same manner as in Example 1. The results obtained are shown in Tables 3 and 4.

COMPARATIVE EXAMPLE 4

30 Units of capacitors were fabricated in the same manner as in Example 1 except for forming the solid electrolyte by washing the aluminum foil every each dipping step and every each polymerization step. These capacitor devices were evaluated on the properties in the same manner as in Example 1. The results obtained are shown in Tables 3 and 4.

COMPARATIVE EXAMPLE 5

30 Units of capacitors were fabricated in the same manner as in Example 1 except for forming the solid electrolyte by setting the polymerization temperature at 70° C. These capacitor devices were evaluated on the properties in the same manner as in Example 1. The results obtained are shown in Tables 3 and 4.

COMPARATIVE EXAMPLE 6

30 Units of capacitors were fabricated in the same manner as in Example 1 except for forming the solid electrolyte by dipping the aluminum foil in the monomer solution for 10 minutes. These capacitor devices were evaluated on the properties in the same manner as in Example 1. The results obtained are shown in Tables 3 and 4.

COMPARATIVE EXAMPLE 7

30 Units of capacitors were fabricated in the same manner as in Example 1 except for forming the solid electrolyte by dipping the aluminum foil in the oxidizing agent solution for 7 minutes. These capacitor devices were evaluated on the properties in the same manner as in Example 1. The results obtained are shown in Tables 3 and 4.

COMPARATIVE EXAMPLE 8

30 Units of capacitors were fabricated in the same manner as in Example 1 except for forming the solid electrolyte by dipping the aluminum foil in the monomer solution for 7 minutes. These capacitor devices were evaluated on the properties in the same manner as in Example 1. The results obtained are shown in Tables 3 and 4.

COMPARATIVE EXAMPLE 9

30 Units of capacitors were fabricated in the same manner as in Example 1 except for forming the solid electrolyte by repeating the dipping step and the polymerization step 40 times. These capacitor devices were evaluated on the properties in the same manner as in Example 1. The results obtained are shown in Tables 3 and 4.

TABLE 3

|  | Initial Properties | | | | | |
| --- | --- | --- | --- | --- | --- | --- |
|  | Capacitance μF | Loss Factor* % | Impedance Ω | Leakage Current μA | Defective Ratio | Number of Short-Circuited Products |
| Example 6 | 51.7 | 0.62 | 0.009 | 0.03 | 0/30 | 0 |
| Example 7 | 50.3 | 0.63 | 0.013 | 0.04 | 0/30 | 0 |
| Example 8 | 51.6 | 0.61 | 0.009 | 0.03 | 0/30 | 0 |
| Example 9 | 50.2 | 0.62 | 0.010 | 0.03 | 0/30 | 0 |
| Example 10 | 51.9 | 0.65 | 0.008 | 0.08 | 0/30 | 0 |
| Example 11 | 49.3 | 0.84 | 0.019 | 0.31 | 0/30 | 0 |
| Comparative Example 2 | 42.1 | 0.76 | 0.035 | 0.80 | 3/30 | 3 |
| Comparative Example 3 | 40.8 | 0.77 | 0.027 | 0.69 | 4/30 | 4 |
| Comparative Example 4 | 30.7 | 0.79 | 0.030 | 0.89 | 3/30 | 3 |
| Comparative Example 5 | 36.9 | 0.74 | 0.035 | 0.95 | 5/30 | 5 |
| Comparative Example 6 | 45.2 | 0.69 | 0.024 | 0.11 | 2/30 | 1 |
| Comparative Example 7 | 49.7 | 0.72 | 0.032 | 0.73 | 2/30 | 1 |
| Comparative Example 8 | 48.0 | 0.69 | 0.022 | 0.10 | 1/30 | 1 |
| Comparative Example 9 | 51.7 | 0.78 | 0.010 | 0.85 | 4/30 | 2 |

*Loss Factor (%) = tan δ × 100 (%)

TABLE 4

|  | Reflow Soldering Test | | Moisture Resistance Test | | |
| --- | --- | --- | --- | --- | --- |
|  | Defective Ratio | Number of Short-circuited Products | Leakage Current μA | Defective Ratio | Number of Short-Circuited Products |
| Example 6 | 0/30 | 0 | 0.53 | 0/30 | 0 |
| Example 7 | 0/30 | 0 | 0.60 | 0/30 | 0 |
| Example 8 | 0/30 | 0 | 0.46 | 0/30 | 0 |
| Example 9 | 0/30 | 0 | 0.71 | 0/30 | 0 |
| Example 10 | 0/30 | 0 | 0.85 | 0/30 | 0 |
| Example 11 | 0/30 | 0 | 0.87 | 0/30 | 0 |
| Comparative Example 2 | 1/28 | 1 | 2.10 | 1/27 | 1 |
| Comparative Example 3 | 1/29 | 0 | 1.75 | 2/28 | 1 |
| Comparative Example 4 | 2/27 | 1 | 3.57 | 4/25 | 2 |
| Comparative Example 5 | 2/28 | 1 | 3.45 | 3/26 | 2 |
| Comparative Example 6 | 1/28 | 0 | 1.12 | 2/27 | 1 |
| Comparative Example 7 | 3/29 | 1 | 1.02 | 3/28 | 2 |
| Comparative Example 8 | 1/28 | 0 | 1.52 | 2/28 | 1 |
| Comparative Example 9 | 2/28 | 1 | 2.12 | 3/27 | 2 |

As seen from Tables 3 and 4 which show the results of examples 6 to 10 and comparative examples 2 to 9, and Tables 1 and 2 which show the results of foregoing examples 1 to 5 and comparative examples 1, a solid electrolytic capacitor device exhibiting excellent results in the initial basic properties such as capacitance, dielectric loss (tan δ), impedance and leakage current and also in the stability to the reflow soldering heat resistance test and the moisture resistance load test is obtained in the case where the dipping time is less than 5 minutes with various monomer solutions used (the dipping time is 5 seconds with 3,4-ethylenedioxythiophene in Example 1, with dihydroisothianaphthene in Example 2, with pyrrole in Example 3, with furan in Example 4 or with aniline in Example 5 and the dipping time is 4 minutes with 3,4-ethylenedioxythiophene in Example 8), in the case where the dipping time in the oxidizing agent-containing solution is less than 5 minutes (Examples 6 to 7), and in the case where the alternate dipping in the monomer solution and in the acid solution is repeated from 15 to 30 times (Examples 9 to 10). On the other hand, in the case where the dipping time in the monomer solution exceeds 5 minutes (Comparative Examples 6 and 8), in the case where the dipping time in the oxidizing agent solution exceeds 5 minutes (Comparative Examples 3 and 7), in the case where the frequency of alternate dipping operations in the monomer solution and in the oxidizing agent solution is small (Comparative Example 2) or too large (Comparative Example 9), in the case where the washing is performed after each polymerization by the alternate dipping (Comparative Example 4) and in the case where the polymerization temperature exceeds 60° C. (Comparative Example 5), the initial basic properties or the reflow soldering heat resistance and moisture resistance load characteristics are not stable.

Industrial Applicability

The solid electrolytic capacitor where solid electrolyte is formed at the cut end part and at the masking part to a larger thickness than in other parts is improved in the adhesion of the solid electrolyte formed on the valve acting metal oxide film and highly stabilized in various basic properties such as capacitance and dielectric loss (tan δ) and also in the reflow soldering heat resistance and moisture resistance load characteristics.

These solid electrolytic capacitor can be obtained by forming electrically conducting polymer on a dielectric film, by specifying time for dipping of surface of a valve actiong metal porous body with a solution containing a monomer and with a solution containing an oxidizing agent, time for vaporization of the solvent of the solution containing a monomer, and polymerization conditions after dipping with the solution containing an oxidizing agent. In this process, the metal surface is alternately dipped with the solution containing a monomer and with the solution containing an oxidizing agent, each in a predetermined number of times and washed at the final stage, whereby an electrically conducting polymer having a layer structure (lamellar structure or fibril structure) which has excellent properties can be obtained.

What is claimed is:

1. A solid electrolytic capacitor comprising a porous valve-acting metal substrate having on the surface thereof a dielectric film and having provided on the dielectric film a solid electrolyte of an electrically conducting polymer obtained by oxidation-polymerizing a monomer of organic polymer using an oxidizing agent, wherein the thickness of the solid electrolyte layer in a peripheral part of the substrate is larger than the thickness of the solid electrolyte layer in a center part of the substrate.

2. A solid electrolytic capacitor comprising a porous valve-acting metal substrate having on the surface thereof a dielectric film and having provided on the dielectric film a solid electrolyte of an electrically conducting polymer obtained by oxidation-polymerizing a monomer of organic polymer using an oxidizing agent, said valve-acting metal porous substrate being cut into a predetermined shape, wherein the thickness of the solid electrolyte layer in a periphery of the cut surface of the substrate is larger than the thickness of the solid electrolyte layer in a center part of the substrate.

3. A solid electrolytic capacitor comprising a porous valve-acting metal substrate having on the surface thereof a dielectric film and having provided on the dielectric film a solid electrolyte of an electrically conducting polymer obtained by oxidation-polymerizing a monomer of organic polymer using an oxidizing agent, said valve-acting metal porous substrate being cut into a predetermined shape, wherein the thickness of the solid electrolyte layer in a periphery of a cut surface of the substrate and in the masking boundary part is larger than the thickness of the solid electrolyte layer in the center part of the substrate.

4. The solid electrolytic capacitor as claimed in any one of claims 1 to 3, wherein the partiality in the thickness of said solid electrolyte is created by the solution chemical oxidative polymerization or vapor phase chemical oxidative polymerization of a monomer of organic polymer performed on said valve-acting metal substrate having thereon a dielectric film.

5. The solid electrolytic capacitor as claimed in claim 4, wherein the partiality in the thickness of said solid electrolyte is created by repeating an operation of alternately dipping said valve-acting metal substrate having thereon a dielectric film in a solution containing a monomer of organic polymer and in a solution containing an oxidizing agent.

6. The solid electrolytic capacitor as claimed in any one of claims 1 to 3, wherein the porous valve-acting metal substrate has a plate- or foil-like shape.

7. The solid electrolytic capacitor as claimed in claim 6, wherein the solid electrolyte is formed such that the center part of the porous valve-acting metal substrate has a guitar- or gourd-like cross section in the longitudinal direction and in the transverse direction.

8. The solid electrolytic capacitor as claimed in claim 7, wherein in the cross section of the center part of the substrate on which a solid electrolyte layer is formed, the difference between the maximum thickness and the minimum thickness is from 0 to 200 $\mu$m.

9. The solid electrolytic capacitor as claimed in any one of claims 1 to 3, wherein the porous valve-acting metal is a simple metal selected from aluminum, tantalum, niobium and titanium, or an alloy thereof.

10. The solid electrolytic capacitor as claimed in any one of claims 1 to 3, wherein the monomer of organic polymer for forming the electrically conducting polymer is a compound containing a 5-member heterocyclic ring, or a compound having an aniline skeleton.

11. The solid electrolytic capacitor as claimed in claim 10, wherein the compound containing a 5-member heterocyclic ring is a compound having a thiophene skeleton or a polycyclic sulfide skeleton.

12. The solid electrolytic capacitor as claimed in claim 11, wherein the monomer compound having a thiophene skeleton is 3-ethylthiophene, 3-hexylthiophene, 3,4-dimethylthiophene, 3,4-methylenedioxythiophene, and 3,4-ethylenedioxythiophene.

13. A solid electrolytic multilayer capacitor obtained by stacking a plurality of sheets of the solid electrolytic capacitor as claimed in any one of claims 1 to 3.

* * * * *